United States Patent [19]

Weaver

[11] 4,394,595
[45] Jul. 19, 1983

[54] STATOR ARRANGEMENT FOR A SYNCHRONOUS MOTOR

[75] Inventor: Robert F. Weaver, Jamestown, Ind.

[73] Assignee: Emhart Industries, Inc., Indianapolis, Ind.

[21] Appl. No.: 185,330

[22] Filed: Sep. 8, 1980

Related U.S. Application Data

[63] Continuation of Ser. No. 965,996, Dec. 4, 1978, abandoned.

[51] Int. Cl.³ .................................................. H02K 21/00
[52] U.S. Cl. ......................................... 310/162; 310/172; 29/596
[58] Field of Search ................................... 310/162-164, 310/172, 156, 190, 49, 40 MM, 194, 254, 41; 29/596

[56] References Cited

U.S. PATENT DOCUMENTS

| 2,951,957 | 9/1960 | Elgeman | 310/172 |
| 3,502,921 | 3/1970 | Suzuki | 310/172 |
| 3,610,980 | 10/1971 | Astic | 310/172 |
| 3,737,695 | 6/1973 | Kilmer | 310/172 |
| 3,909,646 | 9/1975 | Haydon | 310/164 |
| 4,012,652 | 3/1977 | Gilbert | 310/162 |

FOREIGN PATENT DOCUMENTS 1276805 9/1968 Fed. Rep. of Germany ...... 310/162

Primary Examiner—R. Skudy
Attorney, Agent, or Firm—Robert F. Meyer; David W. Gomes

[57] ABSTRACT

A synchronous motor wherein a field coil is positioned adjacent to a rotor and stator assembly in a side-by-side relationship has a stator pole arrangement to compensate for flux phase differences caused by the side-by-side arrangement.

7 Claims, 4 Drawing Figures

STATOR ARRANGEMENT FOR A SYNCHRONOUS MOTOR

This application is a continuation of application Ser. No. 965,996, filed Dec. 4, 1978, now abandoned.

BACKGROUND OF THE INVENTION

Generally speaking, the present invention is directed to a method of providing good starting characteristics in a synchronous motor which includes inter-meshed stator poles and a permanent magnet rotor with rotor poles rotating within the inter-meshed stator poles and wherein a field coil which generates flux to cause rotation of the rotor is disposed adjacent the inter-meshed stator poles in a side-by-side relationship, the method comprising, providing shading means for a predetermined number of stator poles to provide a group of shaded poles and a group of unshaded poles, selecting a reference pole from each of the groups, determining the flux phase difference between the reference pole and individual poles of a group, and converting the phase difference to a mechanical angle and locating the individual poles with respect to each other according to the mechanical angle for an individual pole.

The present invention relates to synchronous motors and more particularly to a synchronous motor wherein a field coil is disposed adjacent to the rotor and stator assembly in a side-by-side relationship.

There are a multitude of applications for synchronous motors of the type having a permanent magnet rotor. Many of these applications are in timing devices such as clocks, and in appliances such as washers and dryers which utilize time sequence switches. Various space requirements in these applications sometimes makes it very difficult to provide adequate space for the synchronous motor. For example, in some applications the space requirements dictate that the field coil, which energizes the motor, be positioned adjacent to the rotor and stator assembly in a side-by-side relationship. Such relationship provides a motor which is flatter than that of a synchronous motor wherein the field coil and the rotor and stator assembly are in axial alignment.

It has been found that when using a side-by-side relationship of the field coil and the rotor and stator assembly that flux phase differences cause the motor to have poor starting characteristics.

OBJECTS OR FEATURES OF THE INVENTION

It is therefore a feature of the present invention to provide a synchronous motor wherein the field coil is disposed adjacent to the rotor and stator pole assembly in a side-by-side relationship. Another feature of the invention is to provide such a motor having good starting characteristics. Another feature of the invention is to provide such a motor having a stator pole arrangement which provides good starting characteristics. Another feature of the invention is the provision of such a motor wherein shading means are applied to groups of poles to start the rotors rotation in a pre-determined direction. Yet another feature of the invention is the provision of such a motor wherein the stator poles are individually located within the unshaded group or the shaded group to provide good starting characteristics. Yet still another feature of the invention is the provision of such a motor wherein the poles within the shaded group or the unshaded group is located in accordance with the flux phase differences of the individual poles of a group. These and other features of the invention will become apparent from the following description taken in conjunction with the accompanying drawings.

FIG. 1 is a section of the synchronous motor taken in elevation.
FIG. 2 is a view taken along the line 2—2 of FIG. 1.
FIG. 3 is a view taken along the line 3—3 of FIG. 1.
FIG. 4 is a schematic diagram of the stator pole arrangement of the synchronous motor.

DETAILED DESCRIPTION OF THE INVENTION

Figure 2:
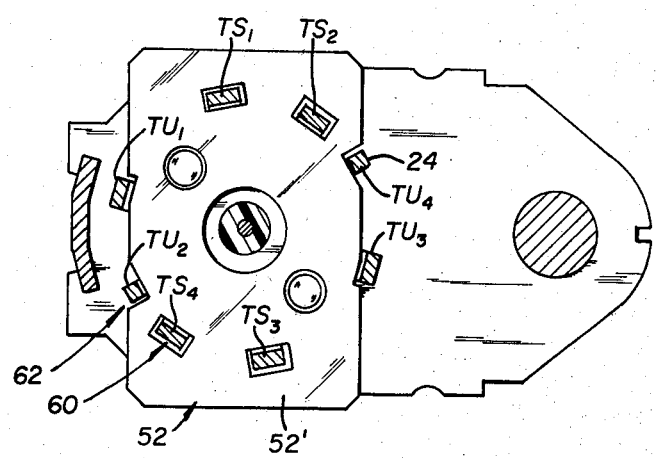
Figure 1:
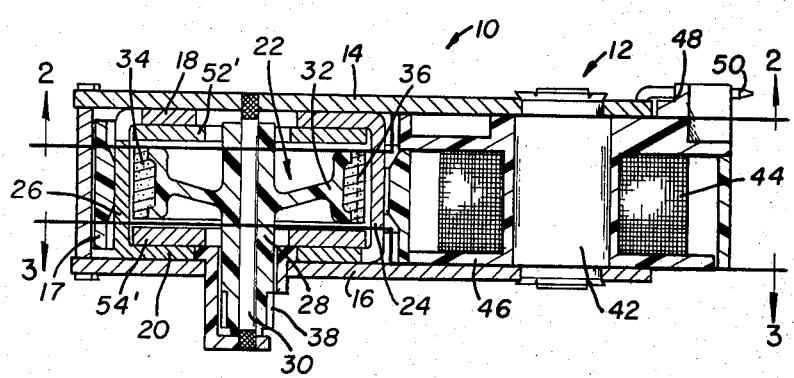

Referring now to the drawings, a synchronous motor 10 of the present invention includes a field coil assembly 12, a field plate 14, a field plate 16, a stator pole cage 18, a stator pole cage 20, a permanent magnet rotor 22. Pole cage 18 has a plurality of stator poles 24 which are inter-meshed between stator poles 26 formed from the pole cage 20. The material for the field plates and the pole cages may be ordinary cold-rolled steel preferably annealed. A ring 17 helps maintain alignment of the pole cages.

Permanent magnet rotor 22 includes a hub portion 28 which rotates about an axle 30 and a web portion 32 which carries a permanent magnet 34. A barium ferrite based material, for example, would be suitable for the permanent magnet with its outer periphery being impressed or magnetized into separate pole segments 36 to provide rotor poles of alternate north and south polarity. As shown, the hub 28 includes a pinion 38 which serves as the output means of the motor.

Field coil assembly 12 includes a core 42 and a field coil 44 carried by a bobbin 46 along with field plates 14 and 16. Coil 44 includes a suitable wire such as AWG copper wire. Included as part of the bobbin is a terminal block 48 which carries electrical terminals 50 which are used to supply alternating current to the coil.

Figure 3:
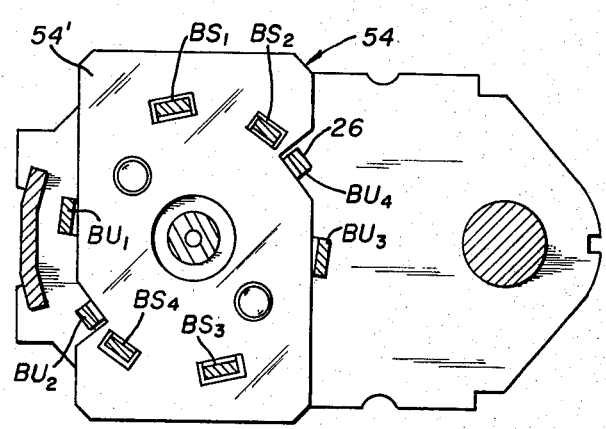

In operation, when an AC current is applied to the coil 44, a flux is generated and passes from the core 42 to the stator pole cages 18 and 20 by way of field plates 14 and 16. Magnetic flux will then be generated between the rotor poles and the stator poles causing the rotor to rotate in a predetermined direction. The direction that the rotor starts to rotate in the present motor is provided by shading means 52 and 54. Referring to FIGS. 2 and 3, shading means 52 and 54 included shading bars 52' and 54' which are applied to a predetermined number of poles to provide groups of shaded and unshaded poles. Calling the poles of FIG. 2 the top poles, the shaded poles are $TS_1$-$TU_4$ and the unshaded poles $TU_1$-$TU_4$. In FIG. 3, the bottom shaded poles are $BS_1$-$BS_4$ while the unshaded are $BU_1$-$BU_4$. The poles are shaded in the present embodiment to provide a clockwise rotation of the rotor.

It had been found in the side-by-side arrangement just described, that even with the shading means the motor will experience difficulty in starting and in addition will not produce optimum running torque. More particularly, it has been found that all of the shaded poles and all of the unshaded poles are not in phase with each other within their group. While not desiring to be so limited, it is believed that such phase differences is due to the amount of distance the flux generated by the coil has to travel in order to reach a particular pole. According to the present invention this problem is solved by providing a pole arrangement wherein the poles within a group are not the usual 180° electrical apart. More specifically, a correction factor is calculated and applied to each pole within a group on an individual basis.

Figure 4:
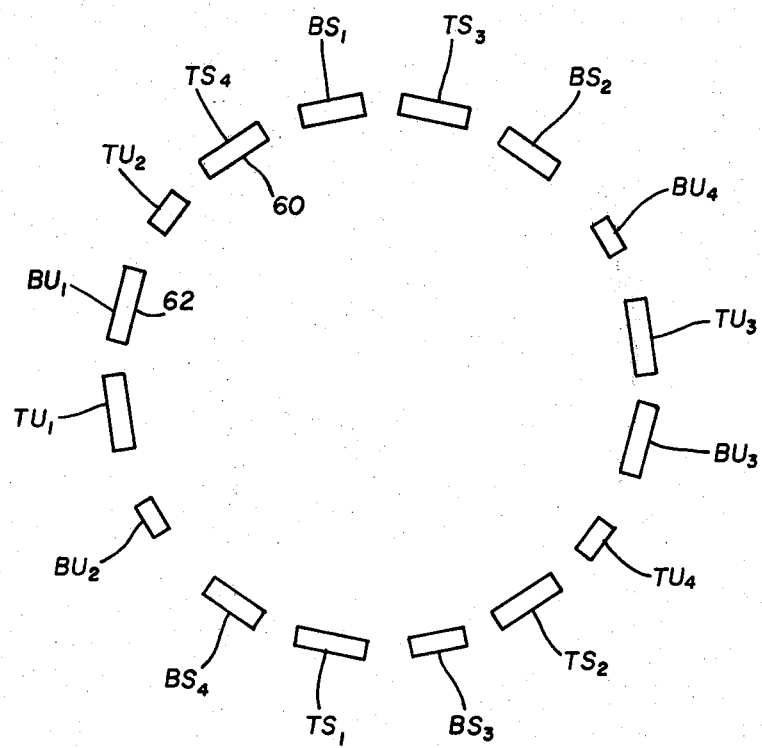

Referring to FIG. 4 it can be seen that there are 16 poles, 8 poles in each 2 groups of 4 each, shaded and unshaded. A reference pole 60 is selected for all the shaded poles and reference pole 62 for all the unshaded poles. Such selection, is arbritary and may be any pole of a group. The phase of the pole flux is then determined for each individual pole in a group by measuring the actual flux phase difference between the individual pole and the reference pole by using the main flux emitting from the core 42 (FIG. 2) in a manner well known in the art. This phase value is converted to a mechanical correction by calculating the time relation between the pole fluxes and then converting this to a mechanical angle. More specifically, the mechanical angle is calculated by the following formula:

$$E = 2\Delta n/N$$

E = correction from 180° electrical degree location in mechanical degrees.

N = number of rotor and stator poles $\Delta n$ = phase difference in electrical degrees (measured)

This correction factor is applied to each pole in each pole in each group.

For example, a phase difference of $+3.6°$ electrical degrees exists between reference pole 60 ($TS_4$) and pole $TS_2$. Pole $TS_2$ is shifted 0.45 mechanical degrees, the direction that it is shifted being dependent upon the polarity of the phase difference. With a clockwise rotor rotation, the pole is shifted counterclockwise.

What is claimed is:

1. A method of providing good starting characteristics in a synchronous motor which includes inter-meshed stator poles and a permanent magnet rotor with rotor poles rotating with said inter-meshed stator poles and wherein a field coil which generates flux to cause said rotation of said rotor is disposed adjacent said inter-meshed stator poles in a side-by-side relationship, the method comprising:
   (a) providing shading means for a predetermined number of said stator poles to provide a group of shaded poles and a group of unshaded poles,
   (b) selecting a reference pole from each of said groups,
   (c) determining the flux phase difference between said reference pole and individual poles of a group,
   (d) converting said phase difference to a mechanical angle and locating said individual poles with respect to each other according to said mechanical angle.

2. A method according to claim 1 wherein said flux phase difference is determined by comparing difference from a common flux source.

3. A method according to claim 2 wherein said common flux source is a core of said field coil.

4. A method according to claim 1 wherein said phase difference is converted to said mechanical angle in accordance with the formula:

$$E = 2\Delta n/N,$$

wherein

E = correction from 180° electrical degree location in mechanical degrees $\Delta n$ = phase difference in electrical degrees (measured)

N = number of rotor and stator poles combined.

5. A method according to claim 1 wherein the unshaded and shaded groups of stator poles are angularly shifted with respect to each other based on an average phase shift produced by said shading means.

6. In a self-starting synchronous motor wherein a permanent magnet rotor having rotor poles rotates within an assembly of inter-meshed stator poles in response to flux generated by a field coil that is disposed adjacent to said assembly in a side-by-side relationship an improvement comprising:
   (a) shading means electrically coupled to a predetermined number of stator poles to provide a group of shaded stator poles and a group of unshaded poles, and
   (b) individual poles of each group offset from a reference pole by a mechanical angle determined by a flux phase difference between said reference pole and individual poles of each group.

7. In a self-starting synchronous motor according to claim 6 said mechanical angle is determined by the formula:

$$E = 2\Delta n/N;$$

wherein

E = correction from 180 electrical degree location in mechanical degree $\Delta n$ = phase difference in electrical degrees (measured)

N = number of rotor and stator poles combined.

* * * * *